United States Patent [19]
Brower et al.

[11] Patent Number: 5,765,491
[45] Date of Patent: Jun. 16, 1998

[54] SEEDLING TRANSFER APPARATUS AND METHOD

[75] Inventors: Lennis R. Brower, Pittsboro; James R. Hammerle, Cary, both of N.C.

[73] Assignee: Precision Measurements Corporation, Raleigh, N.C.

[21] Appl. No.: 708,495

[22] Filed: Sep. 5, 1996

[51] Int. Cl.[6] .................................................. A01C 11/02
[52] U.S. Cl. .................................... 111/105; 406/151
[58] Field of Search ............................... 47/1.01, 74, 1.7; 111/100, 105, 103, 104, 115, 117, 89, 99; 414/527, 467; 406/151, 196, 180, 177

[56] References Cited

U.S. PATENT DOCUMENTS

| | | | |
|---|---|---|---|
| 3,446,164 | 5/1969 | Huang et al. | 111/3 |
| 4,869,637 | 9/1989 | deGoot | 111/105 X |
| 5,209,170 | 5/1993 | Kobayashi | 111/105 |
| 5,431,116 | 7/1995 | Gao | 111/105 |
| 5,445,089 | 8/1995 | Houng et al. | 111/105 |
| 5,488,802 | 2/1996 | Williames | 111/105 X |
| 5,557,881 | 9/1996 | Bouldin et al. | 111/105 X |
| 5,596,938 | 1/1997 | Shaw | 111/105 |

Primary Examiner—Michael J. Carone
Assistant Examiner—Robert Pezzuto
Attorney, Agent, or Firm—Olive & Olive, P.A.

[57] ABSTRACT

An apparatus and method are provided for transplanting seedlings from a starting tray into soil. The plant starting tray is positioned on a table surface and moved so that a first column of seedling cells is aligned over a slot formed through the table. A plant pusher unit pushes a seedling from its seedling cell into a transfer tube. A pressure differential is used to move the seedling from the transfer tube through a flexible seedling valve into a prepared hole in soil.

24 Claims, 8 Drawing Sheets

SEEDLING TRANSFER APPARATUS AND METHOD

BACKGROUND OF THE INVENTION

1. Field of the Invention

This invention relates to mechanical transplanters for transferring seedlings from a plant starting tray to a field location or sales container.

2. Description of the Related Art

Commercial farming operations or nurseries typically utilize a plant starting tray for planting and incubating a seed in a controlled environment. When the seed has germinated and developed to a young plant, referred to as a seedling, the seedling is transplanted to a field location for further development or to a container for sale to the public. The plant starting tray typically has individual seedling cells which are arranged in rows and columns, and in which plants are incubated.

In the past, the seedlings were removed from such plant starting trays by hand. This method obviously involved a substantial amount of labor, in addition to the significant factors of boredom and working in a dirty environment. A commonly used apparatus for transplanting seedlings from their starting trays to the field location in order to reduce the labor factor is a Model 6000 High Speed Metering Transplanter For Seedlings, made by the Mechanical Transplanter Company of Holland, Mich., an illustration of which is seen in FIG. 1. This transplanter opens a furrow to an appropriate depth in the soil, drops a seedling into the opening, and covers the seedling root mass. Such a device, while assisting the workers in the task of transplanting seedlings, does not eliminate the need to manually remove the seedlings from the starting tray and position them for planting in the ground. Depending on the seedling variety, size and the planting density along a row and between rows, it is not uncommon for two workers to pick plants from starting trays and place them into a drop tube in the mechanical transplanter for planting in the ground. Similar situations exist in the operation of planting the seedlings in pots for sale to a consumer.

Until the present invention, even the semi-mechanized seedling transplanting described always required manual labor. A restriction on the mechanization of this transplanting operation in the past was brought about by the fact that the available plant starting trays were essentially an array of contiguous individual pots for incubating seedlings. The operation of grasping an individual seedling, maintaining its soil ball and root mass intact, and placing it in a furrow in the soil was difficult to accomplish with a machine. A recently developed seedling tray enables the individual cells containing seedlings to be formed as a series of tubes each having an open top and an open bottom. This new tray configuration is the subject of U.S. patent application Ser. No.08/597,225, filed Feb. 6, 1996, the teachings of which are incorporated herein by reference. The development of a tray which contains the soil balls in contiguous, open ended tubular cells enables the seedling with its soil ball to be pushed down through the tube, rather than grasped and lifted. Such a process is incorporated in the invention disclosed herein.

It is therefore an object of this invention to provide a seedling transfer apparatus and method capable of automatically transferring seedlings from a starting tray to a secondary growing location.

It is a further object of this invention to provide a seedling transfer apparatus and method capable of operating in concert with a mechanical metering transplanter to plant the seedlings in the soil.

Other objects and advantages will be more fully apparent from the following disclosure and appended claims.

SUMMARY OF THE INVENTION

The present invention provides an apparatus which removes individual seedlings from a starting tray and positions them into a further mechanism for planting. The starting trays are indexed through the apparatus which mechanically moves each seedling and soil ball from each successive cell to a transfer tube. The seedling and soil ball unit is moved from the transfer tube and propelled to a drop tube in a mechanical planter by means of air pressure.

DETAILED DESCRIPTION OF THE INVENTION AND PREFERRED EMBODIMENTS THEREOF

Figure 1:
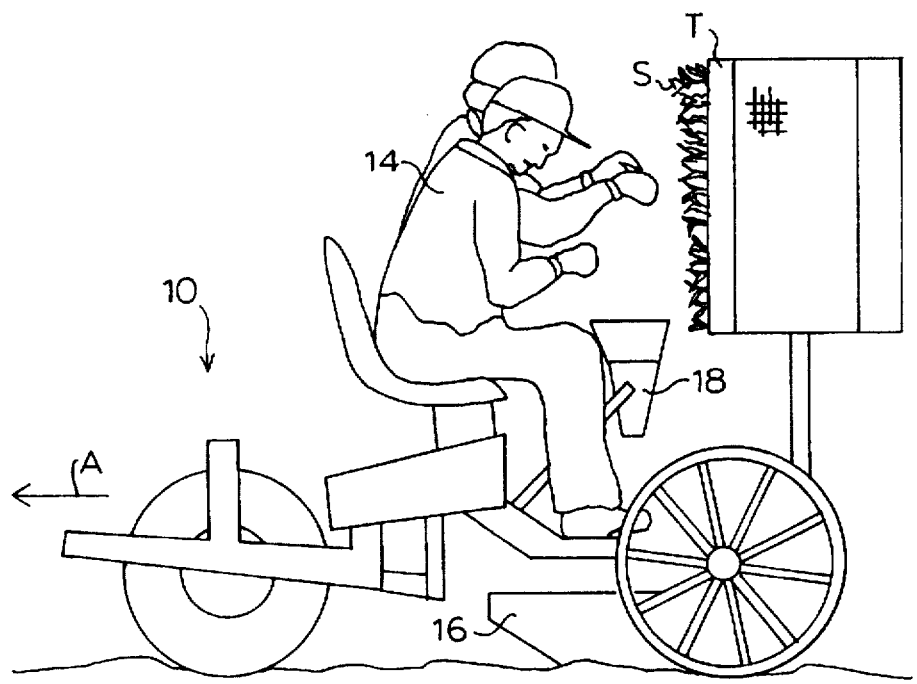
FIG. 1 is a side elevation view of a typical commercial metering transplanter apparatus of the prior art with a pair of workers seated in position for moving seedlings from a plant starting tray to a tube which drops the seedling into a prepared opening in the soil.

As briefly described above, a metering transplanter 10 for semi-automatic planting of seedlings S is illustrated in FIG. 1. Such a metering transplanter 10 is typically pulled through an agricultural field by a tractor (not shown) in a direction indicated by arrow A with one or two workers 14 seated in the operating position. A number of known plant starting trays T, in which the individual seedling cells may have enclosed bottoms, are mounted in front of workers 14 who manually remove each seedling S and its soil ball from tray T in sequence and place them individually into drop tube 18 which incorporates a metering gate (not shown) to deposit seedlings S in a spaced series in a formed furrow. Plow blade 16 forms the furrow in the soil of a size to accommodate seedlings S and re-closes the soil furrow around the deposited seedling soil balls.

Figure 2:
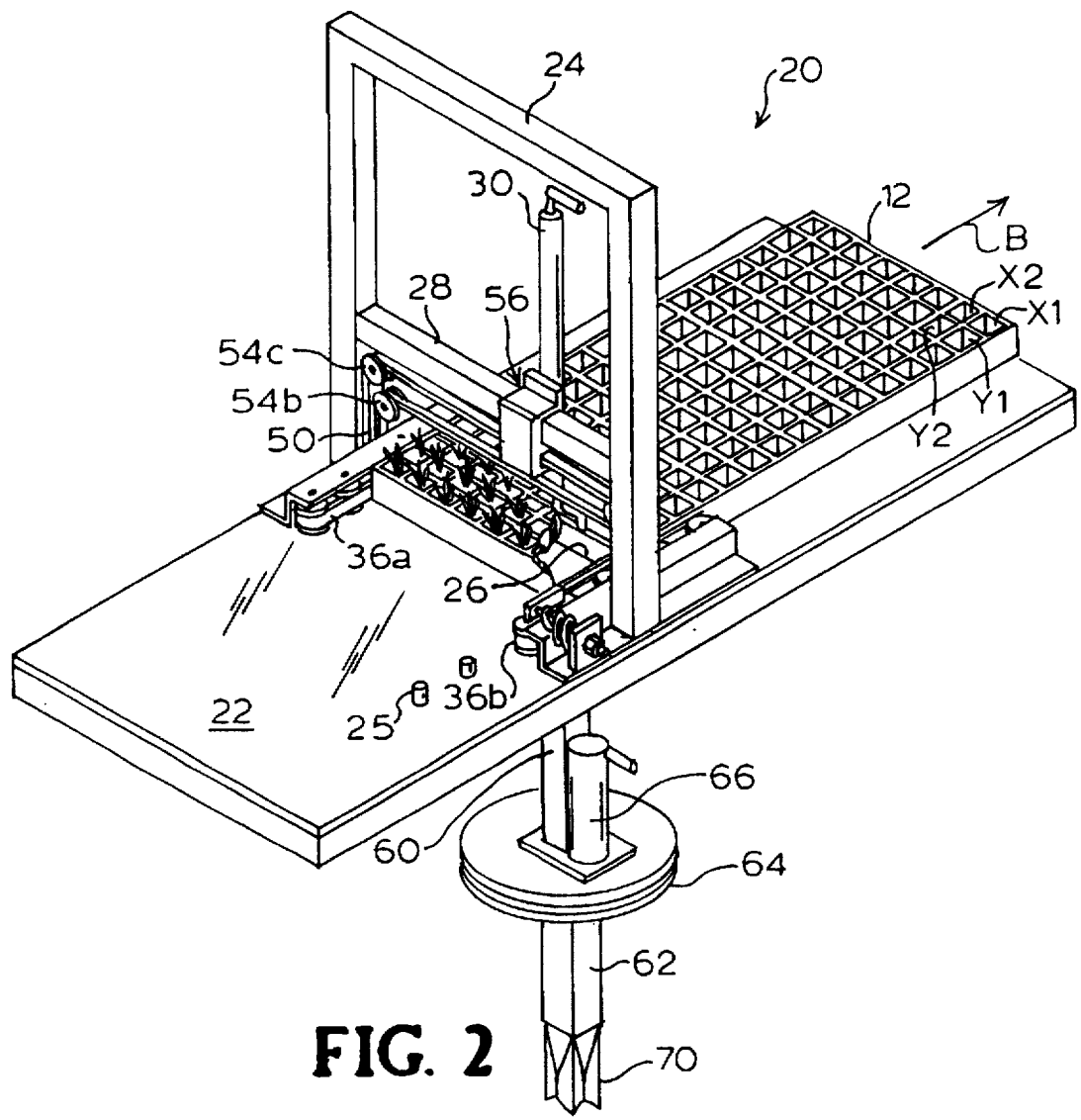
FIG. 2 is a perspective top view of the seedling transfer apparatus of the invention with a plant starting tray mounted thereon as positioned at the end of its travel.

As discussed above, this process of manually removing each seedling S from plant starting tray T and placing it into drop tube 18 is not only labor intensive, but potentially injurious as well. In contrast, the seedling transfer apparatus 20 of the invention as seen in FIG. 2 provides an efficient and reliable solution to the problem by eliminating virtually all manual operations, as disclosed below. When seedling transfer apparatus 20 of the invention is combined with portions of the metering transplanter 10, a fully integrated transplanting machine is created.

Figure 3:
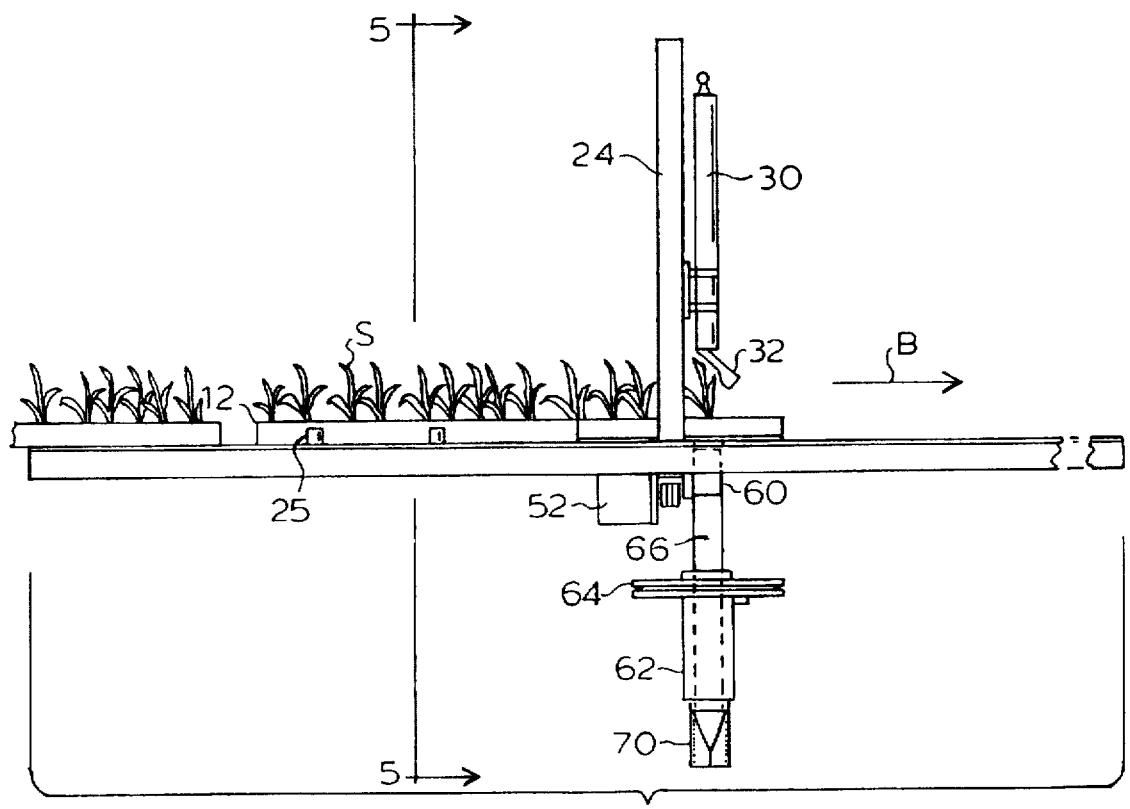
FIG. 3 is a side elevation view of the seedling transfer apparatus of FIG. 2 with a first and second plant starting tray mounted thereon the first tray being in a starting position.
Figure 4:
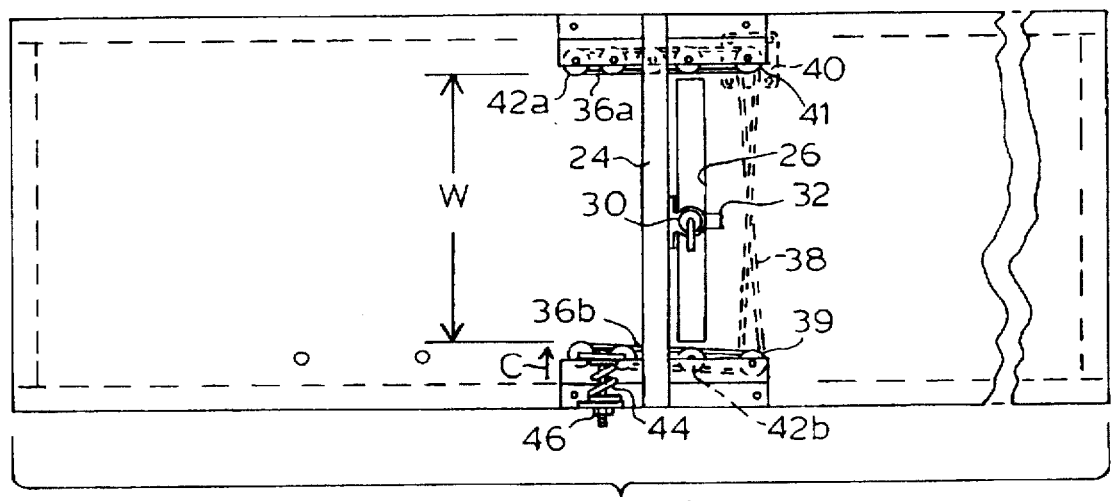
FIG. 4 is a top plan view of the seedling transfer apparatus of FIG. 2 illustrated without a plant starting tray.

Seedling transfer apparatus 20 of the present invention is shown in perspective view in FIG. 2, in side elevation view in FIG. 3 and in top plan view in FIG. 4. Novel plant starting tray 12, preferably having a plurality of seedling cells, each of which is formed with side walls and an open top and open bottom, is positioned on table 22 in contact with guide pins 25 (FIG. 3). Tray 12 is indexed incrementally in the direction indicated by arrow B by a pair of opposed traction belts 36a, 36b to move across slot 26 (see FIG. 4). A first tray drive unit has traction belt 36a entrained on a series of fixedly mounted idlers 42a and driven from servomotor 40 through motor pulley 41 (FIG. 4). Drive belt 38 is mounted with a crossover between motor pulley 41 and driven pulley 39 so as to drive pulleys 39, 41 in reverse rotational directions and move starting tray 12. Starting tray 12 is moved in the direction indicated by arrow B between the side pillars of frame 24. A second tray drive unit has traction belt 36b entrained on a series of idler rollers 42b which are mounted as a linear set to pivot around driven pulley 39 and are biased to press inwardly on starting tray 12 by spring 44 in the direction indicated by arrow C. A stop 46, in the form of an adjustable screw and nut positioned axially through the center of spring 44, acts to limit the pivot travel. In use, the upstream idler pulley 42b moves by ⅛ inch so that dimension W is approximately ⅛ less than the width of a tray to be driven. The radius of idlers 42b is sufficient so that the pivoted pulleys move out when a next tray 12 is placed in operating position. By providing a first traction belt 36a in fixed orientation and a second traction belt 36b to be pivotable, a grip is maintained on starting tray 12 while it is uniformly positioned against a known reference line created by fixedly mounted traction belt 36a. A sensor (not shown) signals the arrival of starting tray 12 at a selected position to initialize the index control relative to slot 26.

Pusher track 28, seen in FIG. 2, is mounted on frame 24 midway up from table 22 for slidingly supporting pressure-operated pusher cylinder 30 for lateral movement thereallong. A transfer tube 60 is mounted so as to be laterally slidable along slot 26 in table 22 and is suspended therebelow so as to remain in axial alignment with pusher cylinder 30. Transfer tube 60 is formed with a square cross section and is oriented with its planar sides parallel to the side surfaces of individual cells X1, X2, etc. (FIG. 2) of starting tray 12 when positioned on table 22. Transfer tube 60 passes perpendicularly downward through the center portion of bellows 64 and terminates in the vicinity of the lower end of vacuum chamber housing 62. The upper plate of bellows 64 is secured to transfer tube 60 and the lower plate to vacuum chamber housing 62. A pressure responsive, flexible, gate 70, normally biased toward remaining substantially closed, is mounted on the lower end of vacuum chamber housing 62.

Figure 13:
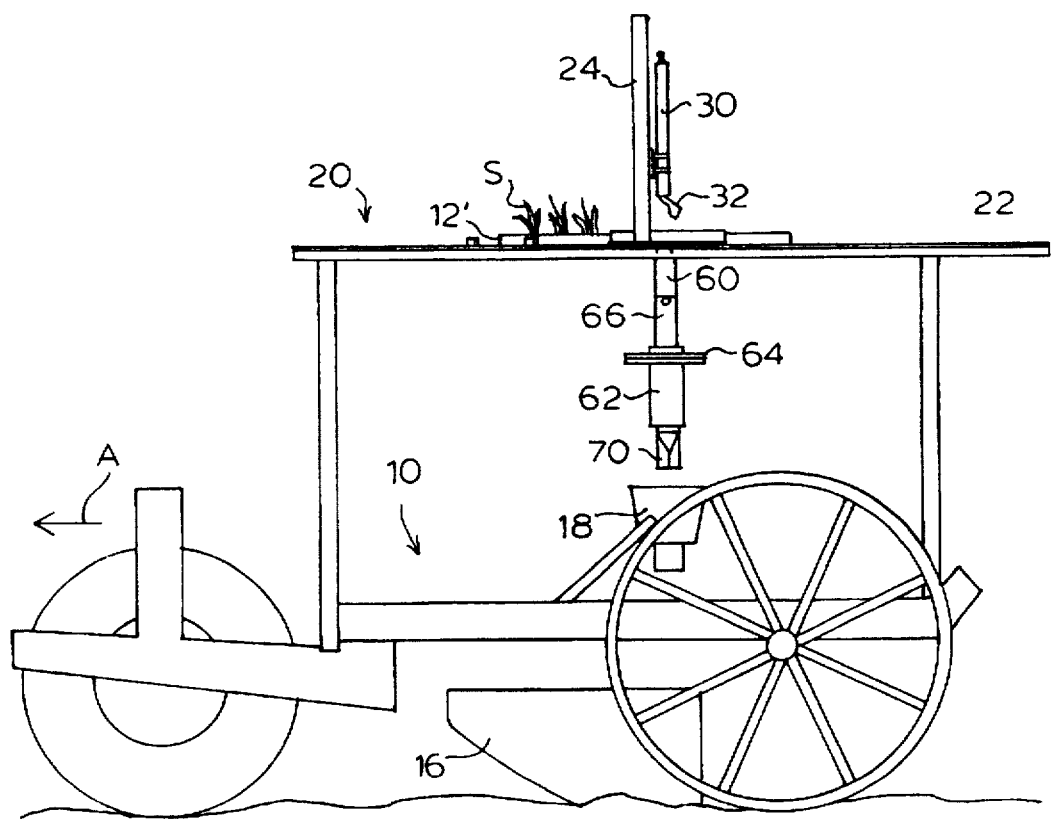
FIG. 13 is a side elevation view of the seedling transfer apparatus of the invention mounted upon a modified version of the known metering transplanter apparatus shown in FIG. 1.

A significant feature of the invention is the method of expelling a seedling from transfer tube 60 into drop tube 18 (see FIG. 13) by means of a differential in air pressure and the response of gate 70 thereto. Transfer tube 60 is sealed to the upper plate of bellows 64 and passes through bellows 64 into vacuum chamber 62 with clearance maintained between transfer tube 60 and vacuum chamber 62. Vacuum chamber 62 is sealed to the lower plate of bellows 64. A substantially sealed chamber 68 (FIG. 7A) is established with a seedling S, including a water-saturated soil ball, positioned in transfer tube 60 and with valve 70 closed. Expansion of bellows 64 will create a negative pressure in closed chamber 68.

Figure 10:
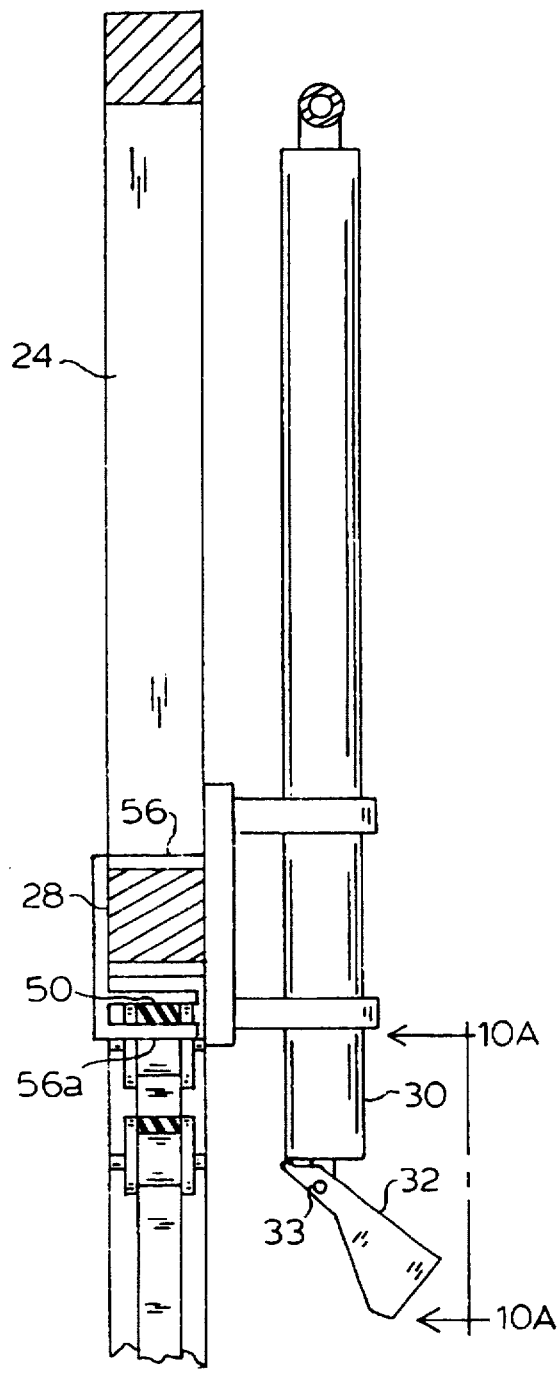
FIG. 10 is a side elevation view of the seedling pusher device of the invention.

A further feature of the invention is that each plant starting tray 12 is caused to move in a straight line through apparatus 20 and a plant transfer unit is moved laterally across each row of seedling cells. The plant transfer unit, comprising pusher cylinder 30 and transfer tube 60, is moved laterally by driven traverse belt 50. Traverse belt 50 is driven by traverse servomotor 52 mounted to the lower surface of table 22, and belt 50 is entrained on idler rollers 54a, 54b, 54c and 54d to move pusher cylinder 30 and transfer tube 60 in the same direction. Pusher cylinder 30 is mounted on slide 56 which straddles pusher track 28 (see FIG. 10). Slide 56 is connected to the portion of transverse belt 50 travelling between idler 54c and idler 54d. Transfer tube 60 is mounted to slide 58 (FIG. 5A) which, in turn, is connected to the portion of transfer belt 50 travelling between idler 54e and traverse motor pulley 54b. Thus, pusher cylinder 30 and transfer tube 60 move in the same direction and the same distance as each other. As pusher cylinder 30 with pusher blade 32 move laterally across seedlings S, pusher blade 32 is held in a tilted orientation to avoid damaging seedlings S, as described below with regard to FIG. 10.

Figure 10A:
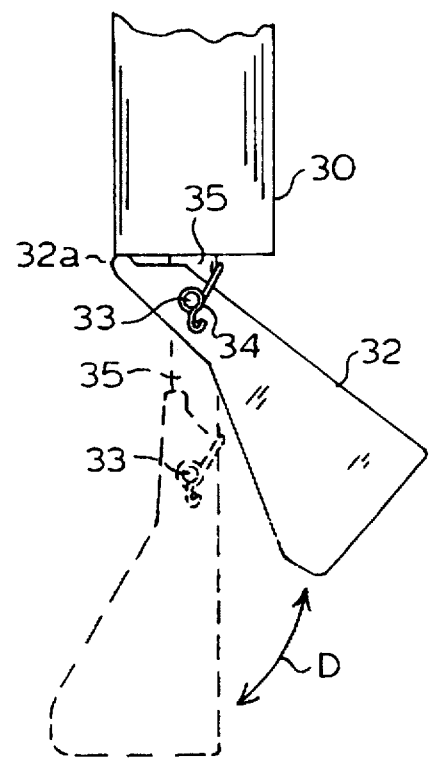
FIG. 10A is an enlarged view of an articulated pusher blade taken in the direction of line 10A of FIG. 10.

As mentioned above, the invention recognizes that since pusher cylinder 30 and pusher blade 32 are moved transversely across starting tray 12 in the sequence of operations depicted by FIGS. 5A–5F, pusher blade 32 must be deflected to a position so as to avoid damage to seedlings S. The feature for providing such deflection is shown in detail in FIGS. 10 and 10A. Pusher cylinder 30 is mounted in substantially vertical orientation on slide 56. In its rest condition, rod 35 of cylinder 30 is retracted within the housing and pusher blade 32 resides adjacent the lower end of cylinder 30. As shown in detail in FIG. 10A, pusher blade 32 is assembled to cylinder rod 35 by means of pin 33, about which blade 32 is freely pivotable. A torsional spring 34 is assembled around pivot pin 33 to bear at one end against rod 35 and at the other end against blade 32 so as to bias blade 32 clockwise as illustrated. The upper portion of pusher blade 32 is formed with a cam tip 32a which engages the bottom of cylinder 30 to cause pusher blade 32 to pivot counterclockwise as it is moving up according to arrow D. When pusher cylinder 30 is activated and cylinder rod 35 extends downwardly, pusher blade 32 pivots clockwise and moves down according to arrow D, and with the aid of spring 34, so as to have its lower surface horizontal to move a seedling.

Figure 5C:
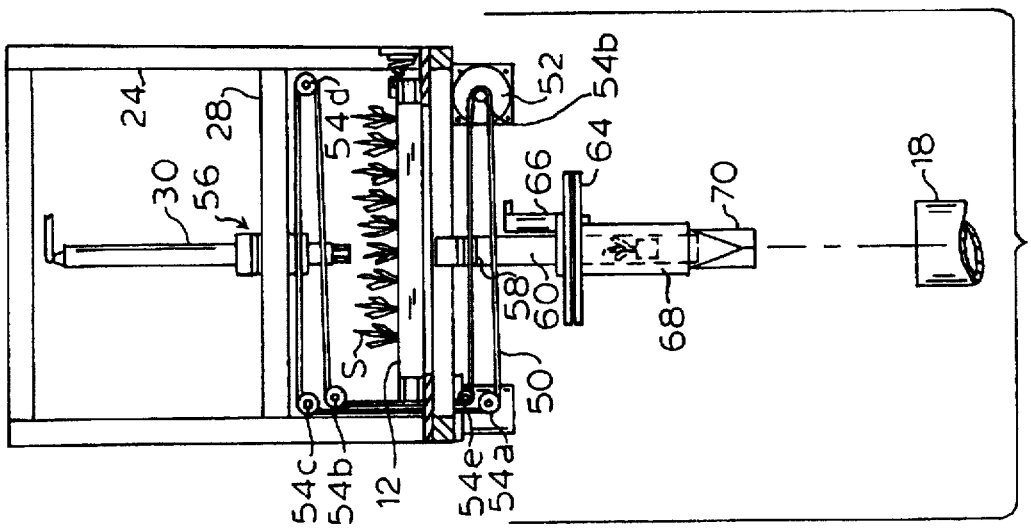
FIGS. 5A–5F show a series of front elevation views of the seedling transfer apparatus taken in the direction of line 5—5 of FIG. 3, each view depicting a sequential schematic representation of the movement and function of the seedling transfer unit of the invention.
Figure 5B:
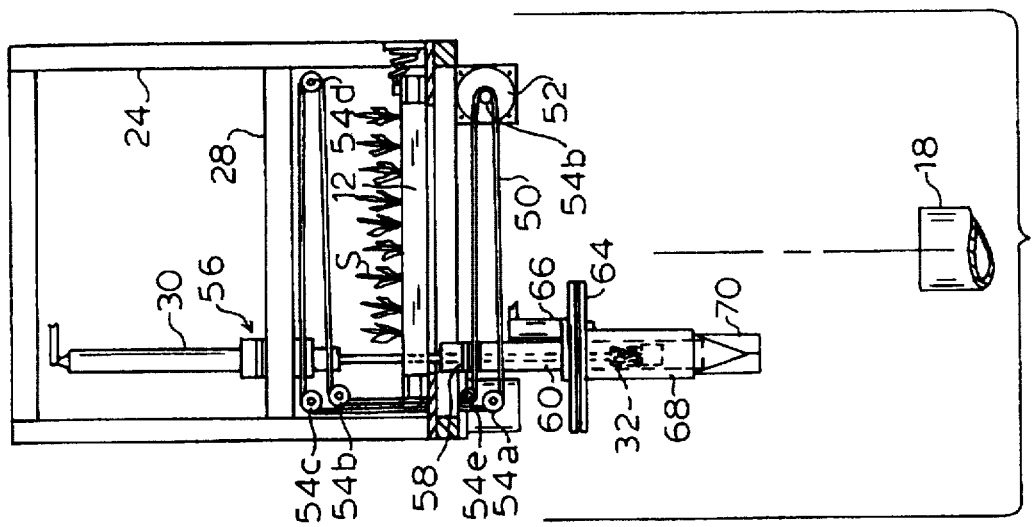
Figure 5A:
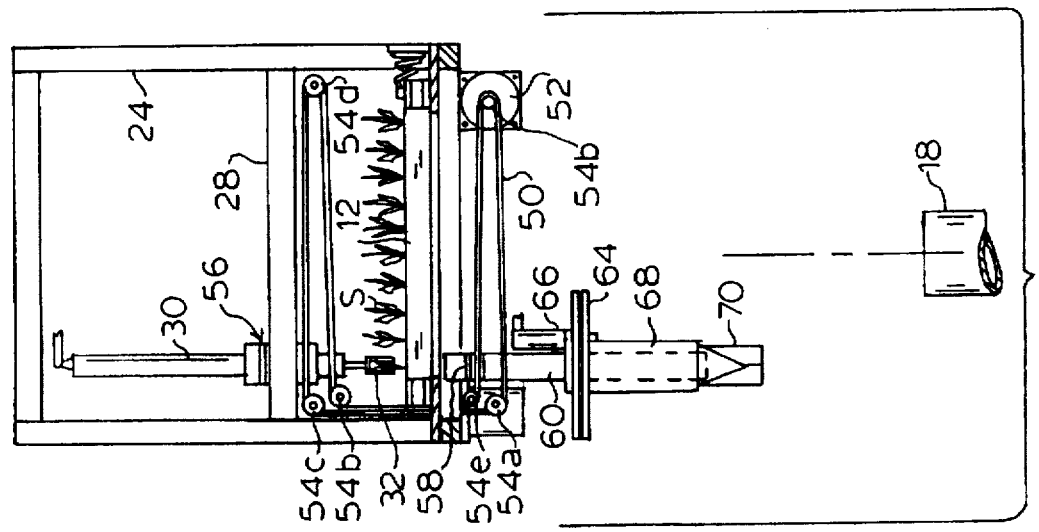

The operation of the seedling transfer apparatus 20 of the invention is illustrated schematically in FIGS. 5A–5F. Reference is also made to plant starting tray 12 as shown from above in FIG. 2 with representative cells identified as X1, X2, etc. in a first row thereof and as Y1, Y2 in a second row thereof. Cells X1, Y1, etc. form Column 1. Upon receiving a signal from metering transplanter 10 (see FIG. 13) that its drop tube 18 is empty, pusher cylinder 30 and transfer tube 60 are moved laterally by transverse belt 50 to align with a first cell, for example X1, of starting tray 12 (FIG. 5A). At this position, transfer tube 60 is out of alignment with drop tube 18.

In FIG. 5B, with pusher cylinder 30 and transfer tube 60 positioned centrally with respect to a first tray cell X1, pusher cylinder 30 is activated and pusher blade 32 moved downward. As pusher cylinder 30 moves pusher blade 32 downward, pusher blade 32 is made vertical as described above. Pusher blade 32 moves through cell X1 to move a first seedling S into transfer tube 60. Pusher cylinder 30 is next deactivated and pusher blade 32 is retracted to its tilted position above starting tray 12, such is shown in FIG. 5A.

The continuously aligned transfer unit consisting of pusher cylinder 30 and transfer tube 60 are next moved laterally so as to align coaxially with drop tube 18, as illustrated in FIG. 5C.

At this point in the process, bellows 64, previously kept in the closed condition, is rapidly opened by extension of pressure-operated bellows cylinder 66, thus creating a pressure reduction by virtue of enlargement of substantially sealed chamber 68, defined by seedling S, transfer tube 60, vacuum chamber housing 62, bellows 64 and valve 70. With a lower pressure within chamber 68 than in the ambient air, valve 70 is pressed tightly closed and the only component left free to move in response to the internal pressure drop is seedling S, which is drawn downward through transfer tube 60. As seedling S travels downward, the size of chamber 68 is reduced, so that the difference in pressure between the inner chamber 68 and ambient air is reduced. The volume of chamber 68 is sized and configured, according to the preferred embodiment, so that when seedling S approaches valve 70 the pressure of the interior and exterior of valve 70 approaches equalization. However, since the pressure differential was generated through a rapid expansion of bellows 64, seedling S is moving with some velocity and inertia, and therefore pushes easily through relaxed valve 70 to be expelled into drop tube 18, as in FIG. 5D.

Figure 5F:
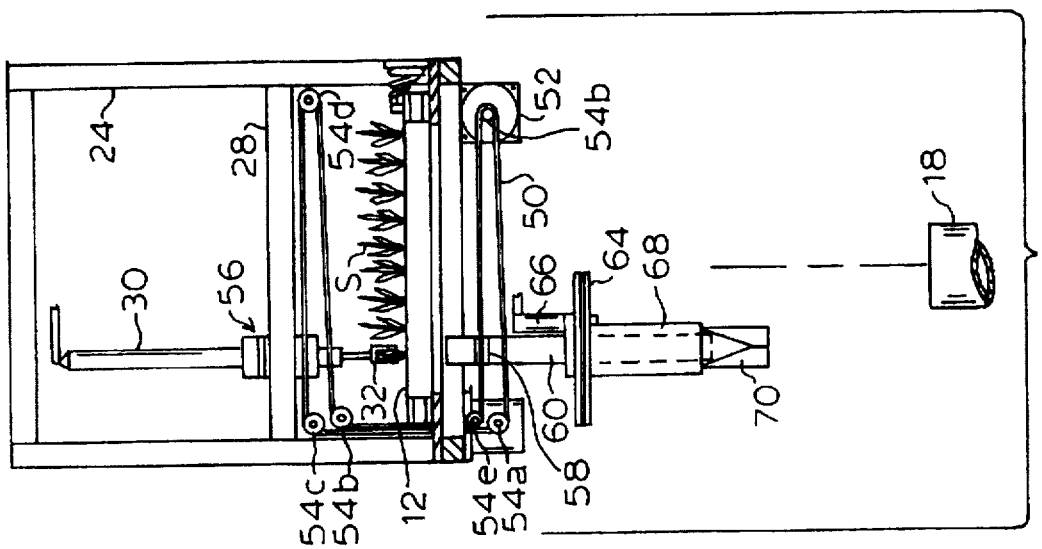
Figure 5E:
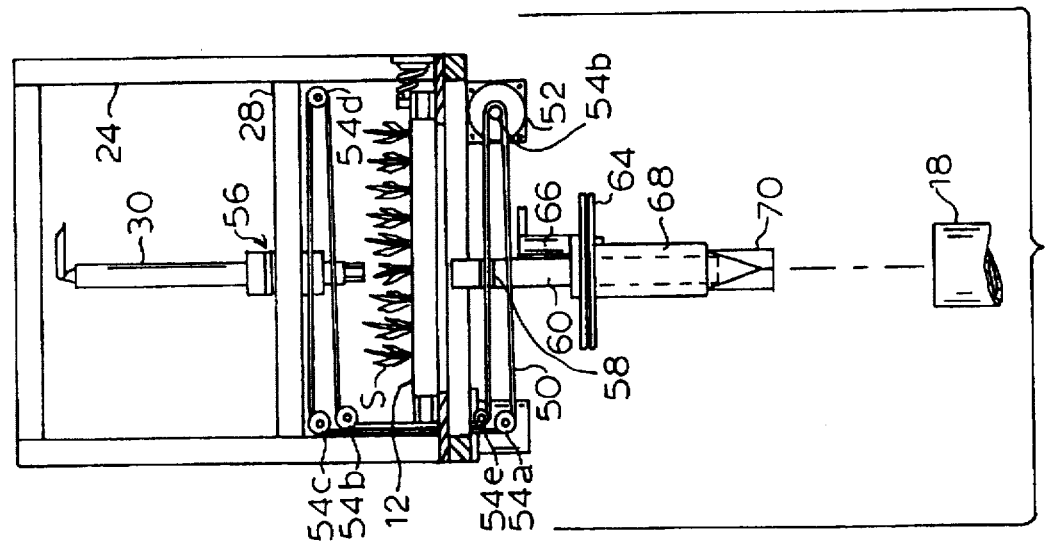

As seen in FIG. 5E, bellows 64 next contracts to its original closed condition. At this point, seedling S has been deposited within drop tube 18 of metering transplanter 10 (see FIG. 1, 13) and is thus discharged from the invention apparatus.

In FIG. 5F, pusher cylinder 30 and transfer tube 60 have moved out of alignment with drop tube 18 to a position over a second seedling cell X2 for the transfer of a further seedling S.

Figure 5D:
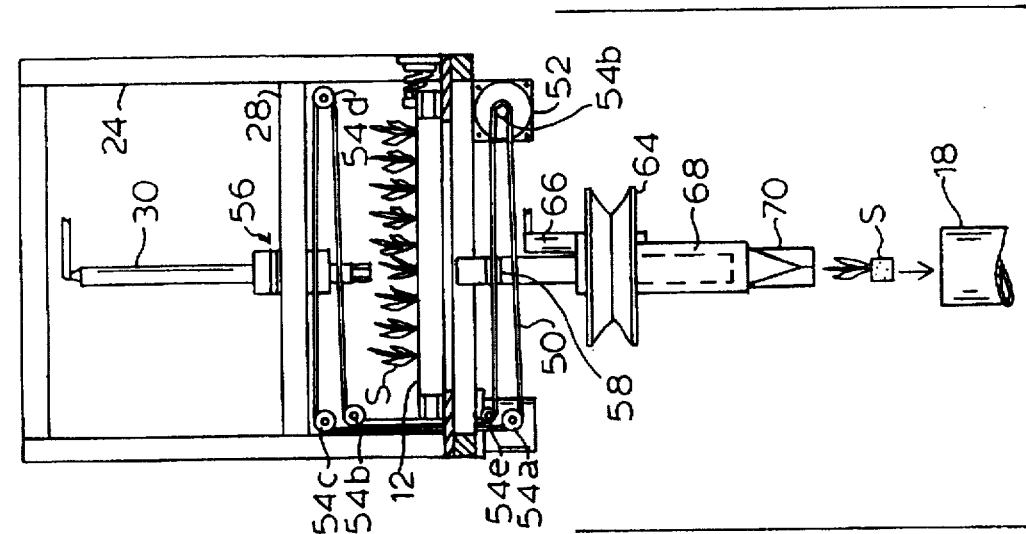

FIGS. 6A and 6B, 7A and 7B, 8A and 8B, 9A and 9B depict the detail of motions occurring in the steps of FIGS. 5C, 5D and clearly illustrate the steps described above in generating the pressure differential and expelling the seedling, with detail of valve 70 in each step as viewed from below. To fully appreciate the sequence of FIGS. 6–9, reference is made to FIGS. 11 and 12 in which valve 70 is illustrated.

Figure 6A:
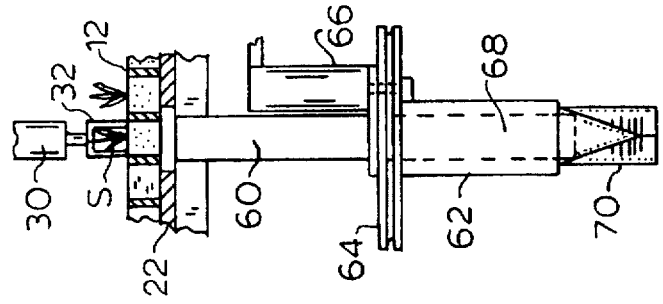
FIG. 6A is a front elevation of a seedling transfer unit portion of the invention apparatus prior to insertion of a seedling thereinto.
Figure 6B:
FIG. 6B is a bottom plan view of a flexible seedling valve of the seedling transfer unit in relaxed mode as in the situation of FIG. 6A.

In FIGS. 6A and 6B, bellows 64 is closed and valve 70 is relaxed; no significant pressure differential exists between inner chamber 68 and the ambient atmosphere. Pusher blade 32 is positioned to move a seedling S from a starting tray 12 to transfer tube 60.

Figure 7A:
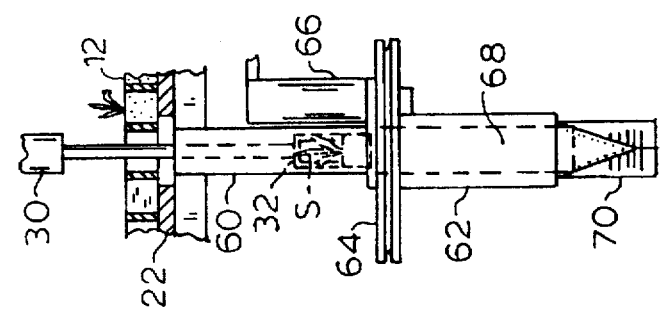
FIG. 7A is a front elevation of the seedling transfer unit upon insertion of the seedling thereinto.
Figure 7B:
FIG. 7B is a bottom plan view of the flexible seedling valve of the transfer unit in relaxed mode as in the situation of FIG. 7A.

In FIGS. 7A and 7B, bellows 64 remains in the closed position and valve 70 is relaxed. Pusher blade 32 has been moved downward by pusher cylinder 30, and seedling S is placed into transfer tube 60.

Figure 8A:
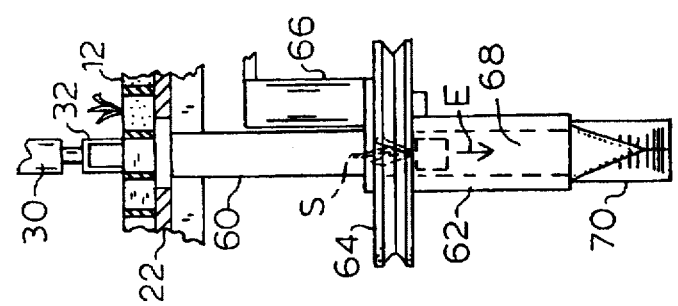
FIG. 8A is a front elevation of the seedling transfer unit upon initiation of a pressure differential by expansion of a bellows thereof.
Figure 8B:
FIG. 8B is a bottom plan view of the flexible seedling valve of the transfer unit tightly closed due to the pressure differential as in the situation of FIG. 8A.

In FIGS. 8A and 8B, bellows 64 has begun to be expanded by extension of bellows cylinder 66 whereby to generate a vacuum in chamber 68 and connected transfer tube 60 beneath the level of seedling S. Due to the vacuum generated within chamber 68 in comparison to atmospheric pressure without, valve 70 is held tightly closed. As noted above, the soil ball attached to seedling S fills the opening of transfer tube 60 to complete the enclosure of chamber 68. Seedling S begins to move down in transfer tube 60 as shown by arrow E.

Figure 9A:
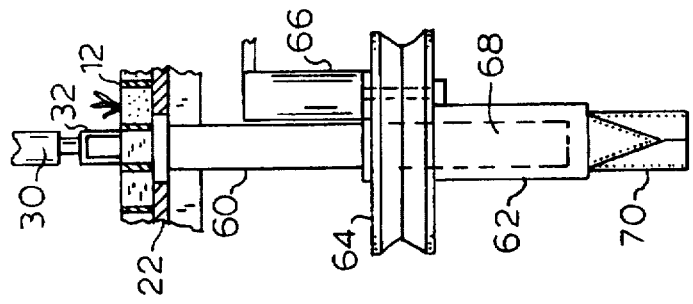
FIG. 9A is a front elevation of the seedling transfer unit propelling the seedling downwardly by pressure differential due to expansion of the bellows thereof.
Figure 9B:
FIG. 9B is a bottom plan view of the flexible seedling valve of the transfer unit fully opened due to seedling propulsion as in the situation of FIG. 9A.

As bellows 64 continues to expand toward its fully open condition shown in FIG. 9A, pressure differential is maintained to cause seedling S to accelerate downward toward flexible valve 70. At the point at which bellows 64 reaches its maximum volume, seedling S is approaching the bottom of chamber 68, the downward movement acting to reduce the chamber volume. The volume of chamber 68 is configured to be substantially equal to the volume of expansion of bellows 64 and thus, as seedling S reaches flexible valve 70, the volume in chamber 68 below seedling S is near zero and the differential pressure from atmospheric is also near zero. At zero pressure differential valve 70 is relaxed. Seedling S is carried through valve 70 by its inertia, to be deposited into drop tube 18 (see FIG. 5D).

Figure 11:
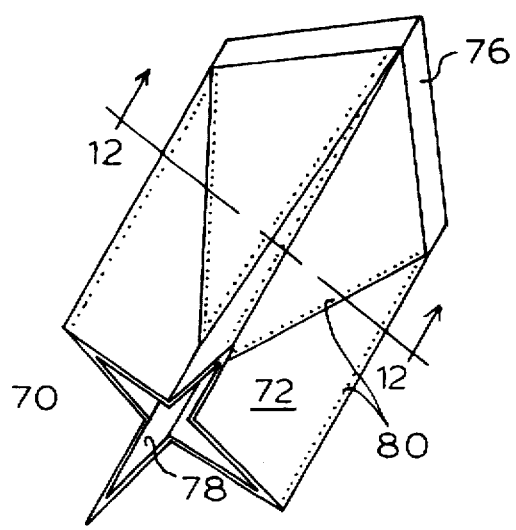
FIG. 11 is a perspective bottom view of the flexible seedling valve of the invention in a relaxed mode.
Figure 12:
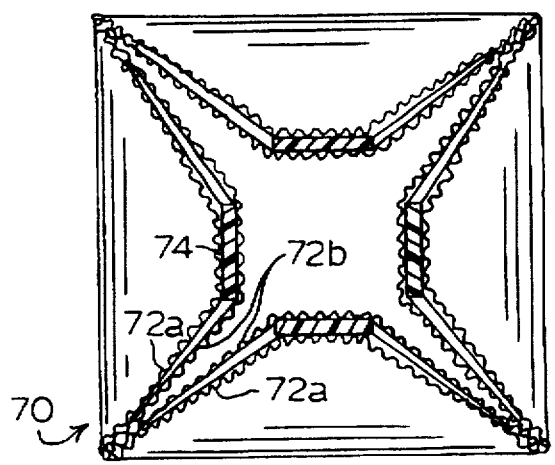
FIG. 12 is a cross sectional view of the seedling valve taken in the direction of line 12—12 of FIG. 11.

Flexible valve 70, shown in detail in FIGS. 11 and 12 combines flexibility and resiliency to form a pressure-actuated automatic closure. Valve 70 is formed as a three-layer laminated four-sided pyramid with inwardly directed bias, the layers being outer skin 72a, plate 74 and inner skin 72b. Plate 74 is formed of resilient plastic sheet, such as, for example, polyethylene, cut as four equal isosceles triangles. Outer skin 72a and inner skin 72b are both formed of a supple, flexible membrane, such as, for example, rubber laminated cloth. The four plates 74 are secured between inner and outer skins 72a, 72b by fastening means, for example stitching 80 formed in a pattern bordering plates 74 to form a four-sided pyramid, and all parts are assembled to band 76 for assembly to the lower end of vacuum chamber housing 62. The stitching 80 around the periphery of each plate 74 and along the apex of each spoke of valve 70 remains such that in its relaxed condition, i.e. without the effect of a differential pressure, the mouth 78 of valve 70 remains almost closed. External or internal pressure will cause mouth 78 to totally close or readily open, respectively (see FIGS. 8B and 9B).

In keeping with the objectives noted above, seedling transfer apparatus 20 is illustrated mounted on the frame of the known metering transplanter 10 described above as shown in FIG. 13. The combined transplanter machine is operable without a need for continuous direct labor. At the completion of the planting of seedlings S from each tray 12, a new tray is to be placed on table 22 of seedling transfer apparatus 20. A magazine adapted for the storage and automatic feeding of sequential trays is contemplated as being within the scope of the present invention.

Figure 14:
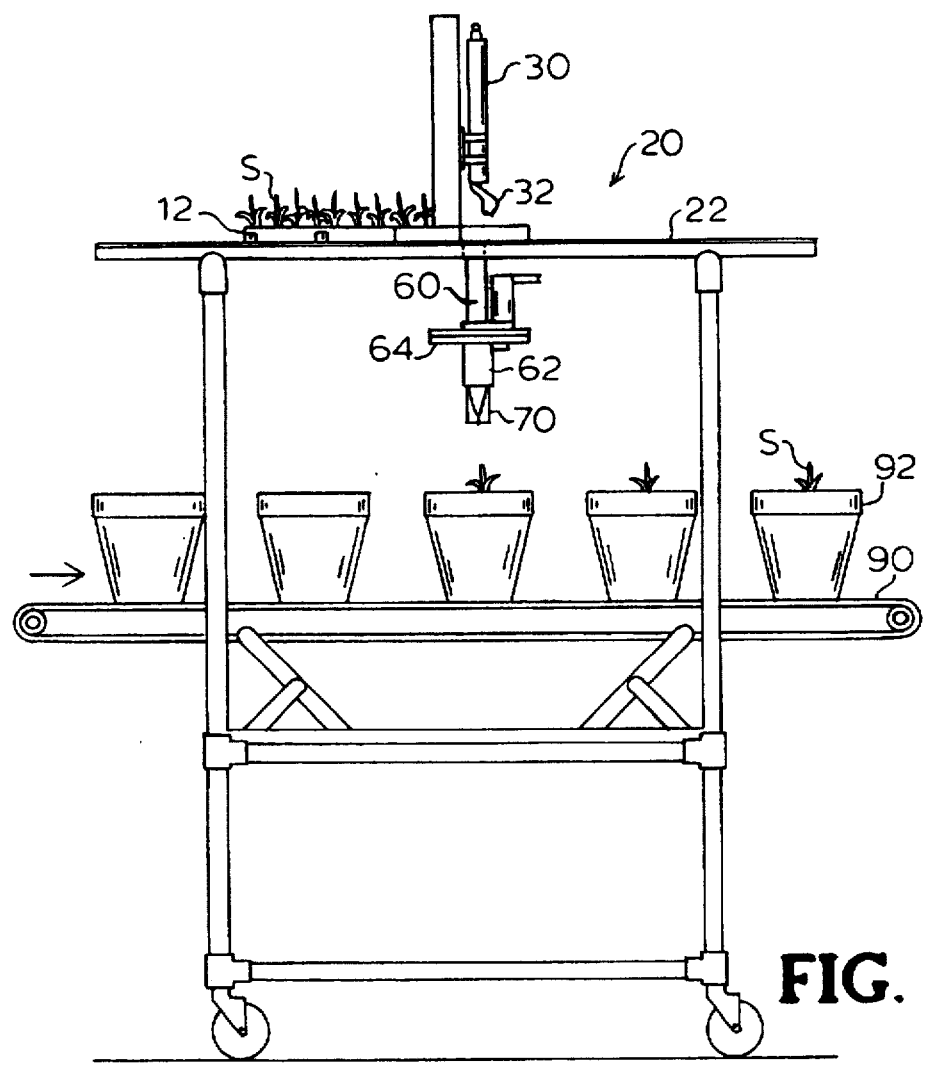
FIG. 14 is a side elevation view of the seedling transfer apparatus of the invention mounted upon a conveyorized plant pot mechanism.
Figure 11:
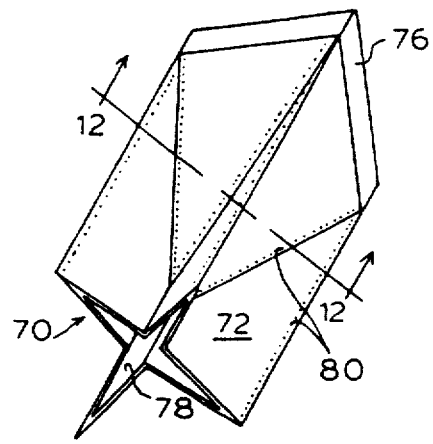
Figure 12:
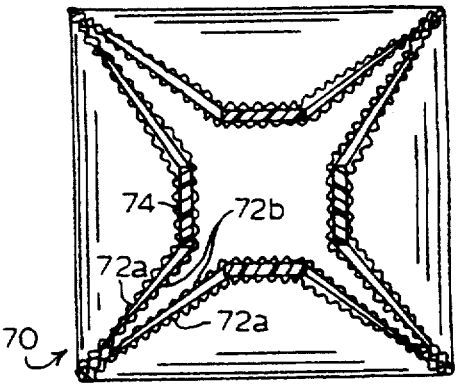
Figure 14:
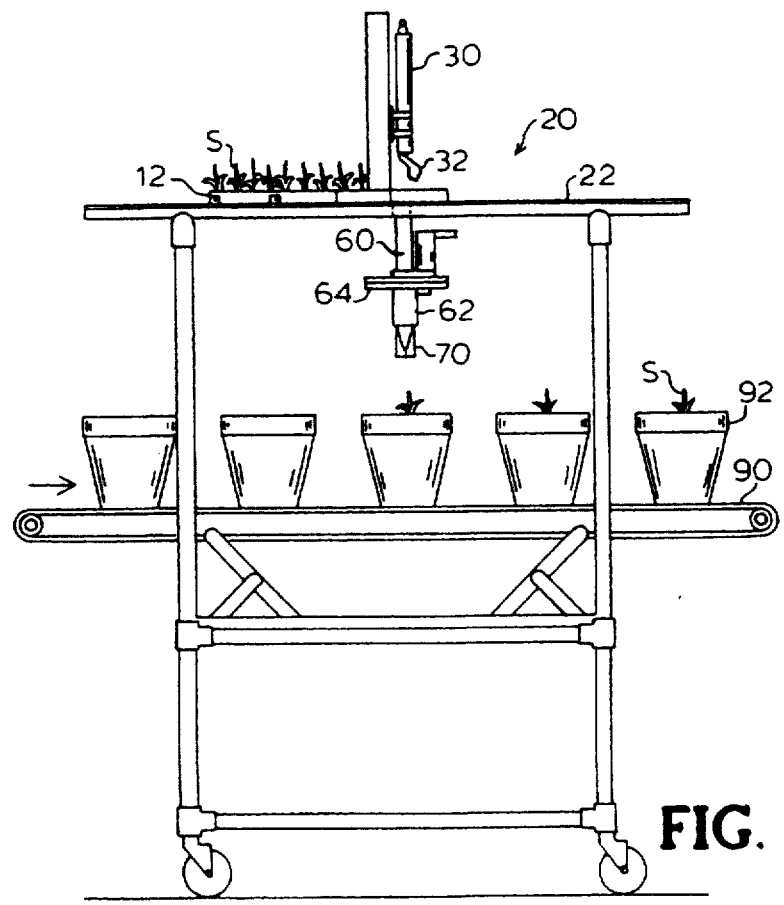
Figure 5A:
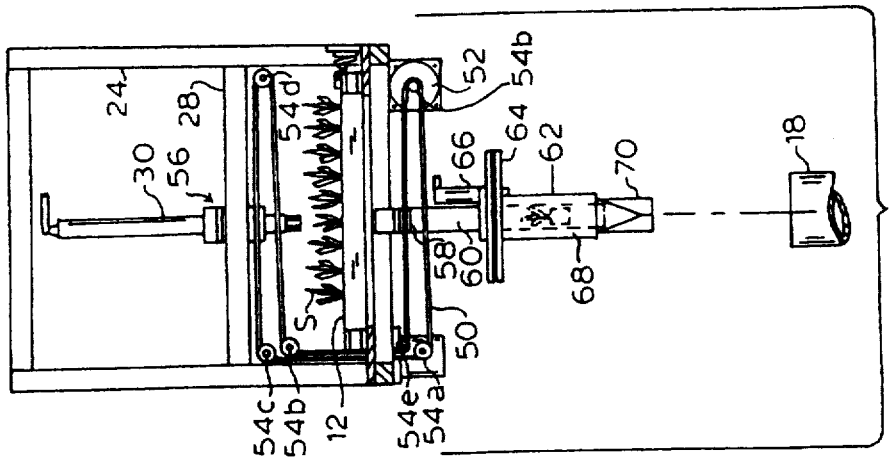
Figure 5B:
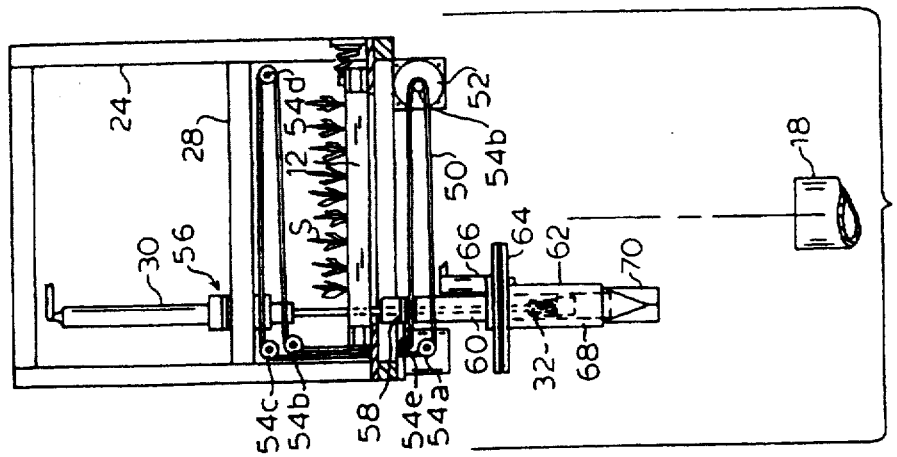
Figure 5C:
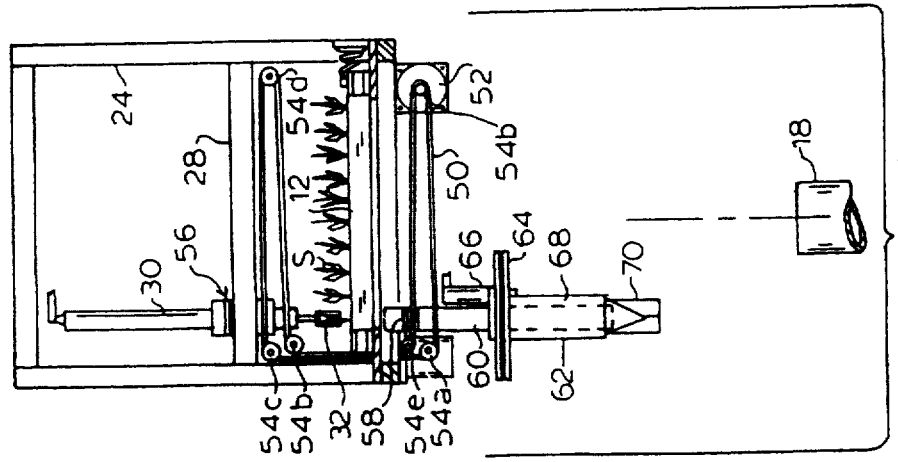
Figure 5F:
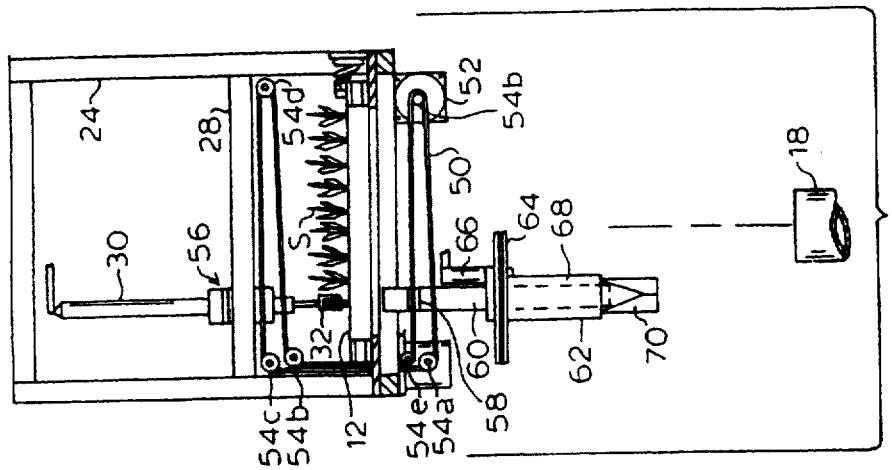
Figure 5E:
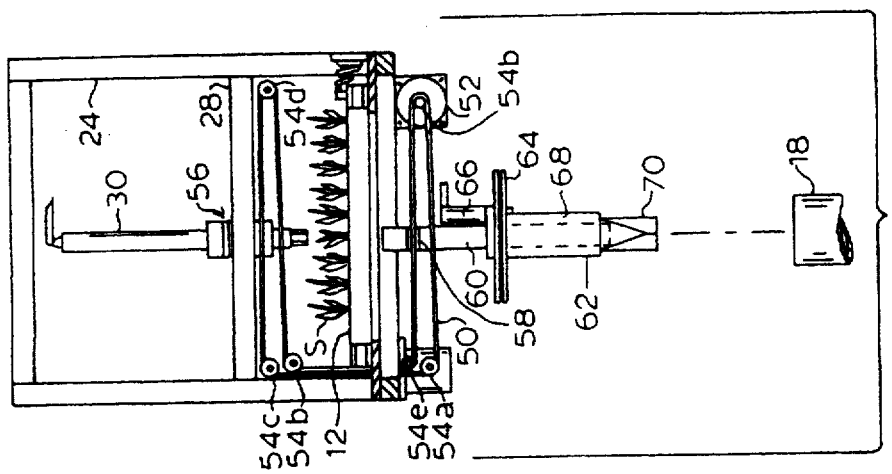
Figure 5D:
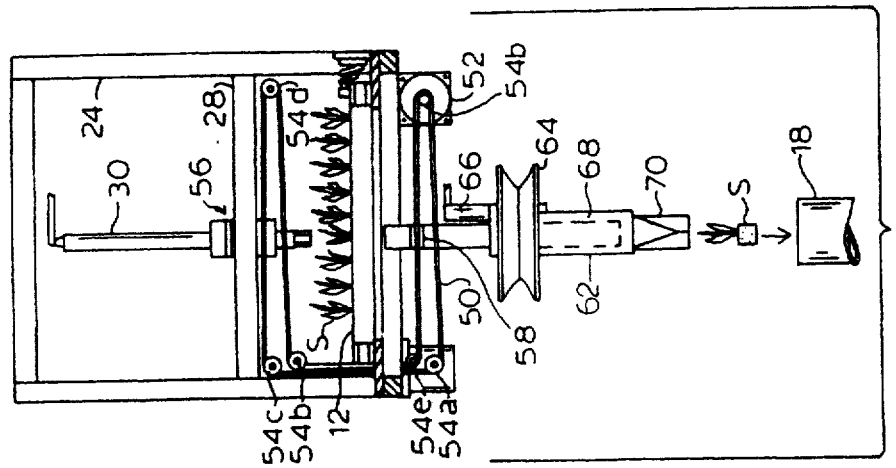

A further use for the seedling transfer apparatus of the invention is shown in FIG. 14, where apparatus 20 is mounted on a frame over a driven conveyor 90 which conveys a series of plant pots 92 from left to right, as illustrated. Each pot 92 contains soil which has been prepared with a hole into which a seedling S is to be placed. A sensor (not shown) may be used to actuate apparatus 20 when pot 92 is properly placed to drop a seedling S into the prepared hole, and a further mechanism (not shown) is used to pack the soil around, and secure, seedling S in its transplanted position.

The sequence of operations through which the apparatus components proceed is directed by a typical chip microprocessor, and is portrayed by the following chart.

| Stimulus | Action |
| --- | --- |
| 1. Plant starting tray contacts sensor at traction belts. | a. Traction motor drives traction belts to align first plant row of tray over table slot; |
| | b. Traverse motor drives plant pusher unit to align over tray at row 1, column 1. |
| 2. Metering transplanter drop tube generates empty signal. | a. Pusher cylinder pushes plant from row 1, column 1 into transfer tube and retracts. |
| | b. Pusher cylinder moves pusher blade to move seedling through cell into transfer tube. |
| | c. Traverse motor moves pusher unit to center. |
| | d. Bellows cylinder extends to expand bellows, seedling expelled. |
| | e. Bellows cylinder retracts to collapse bellows. |
| | f. Traverse motor drives pusher unit to row 1, column 2. |
| 3. Sensor indicates plant pusher unit is at last row. | a. At end of sequence, all rows completed, traction motor drives tray out. |

While the invention has been described with reference to specific embodiments thereof, it will be appreciated that numerous variations, modifications, and embodiments are possible, and accordingly, all such variations, modifications, and embodiments are regarded as within the spirit and scope of the invention.

What is claimed is:

1. A seedling transfer apparatus for transferring seedlings from a plant starting tray having a plurality of seedling cells each with side walls and an open top and bottom and having a seedling with a soil ball contained therewithin, said apparatus comprising:

(a) a substantially horizontal rectangular table of defined length and width and having an elongate slot formed widthwise thereof and vertically therethrough;

(b) indexing means to controllably index said starting tray in a direction substantially perpendicular to said slot;

(c) means mounted on said table above said slot and capable of moving between an up and a down position for pushing a selected seedling and soil ball downwardly out of a selected cell in said tray and positionable along a line substantially parallel to said slot;

(d) a tube mounted on said table below said slot co-axial and positionable with said pushing means, said tube adapted for receiving said selected seedling from said pushing means so that said soil ball of said selected seedling substantially engages an inner periphery of said tube;

(e) means for moving said seedling and said soil ball out of said tube; and (f) means for moving said pushing means and said tube synchronously along a line substantially parallel to said slot to align with sequential ones of said plurality of cells.

2. The seedling transfer apparatus as described in claim 1, wherein said indexing means comprises a pair of opposed drive units positioned for engaging and driving opposite sides of said plant starting tray.

3. The seedling transfer apparatus as described in claim 2, wherein at least one of said pair of drive units is mounted and biased so as to press said plant starting tray against the other of said pair of drive units when said plant starting tray is positioned intermediate said pair of opposed drive units.

4. The seedling transfer apparatus as described in claim 3, wherein each of said drive units comprises a belt being entrained on a series of rollers to form an elongate drive surface for engaging and driving said plant starting tray.

5. The seedling transfer apparatus as described in claim 1, wherein said pushing means comprises a linear motion device having a pusher blade mounted to a rod forming a part of said linear motion device and sized to push said seedling and said soil ball through said selected cell.

6. The seedling transfer apparatus as described in claim 5, wherein said linear motion device comprises a pressure-operated cylinder.

7. The seedling transfer apparatus as described in claim 5, further comprising means to pivot said pusher blade upwardly when said pushing means is in an up position.

8. The seedling transfer apparatus as described in claim 7, wherein said pivoting means comprises a cam portion of said pusher blade configured and positioned to contact a fixed member as said pusher blade is moved up such that a lower portion of said pusher blade pivots upwardly.

9. The seedling transfer apparatus as described in claim 1, wherein said means for moving said seedling and said soil ball out of said tube comprises means to create a pressure differential between a location above said soil ball and a location below said soil ball within said tube.

10. The seedling transfer apparatus as described in claim 1, further comprising an expandable chamber connected at a first end in sealed relation to said tube and having a pressure-responsive valve at a second end thereof.

11. The seedling transfer apparatus as described in claim 10, further comprising means to expand said expandable chamber.

12. The seedling transfer apparatus as described in claim 11, wherein said valve comprises a flexible membrane formed tubularly and having biasing means for maintaining said valve substantially closed.

13. The seedling transfer apparatus as described in claim 12, wherein said chamber second end is substantially square in cross section and said tubularly formed valve membrane is substantially square in cross section of a size at a first end for mounting on said chamber second end and said biasing means comprises a plurality of resilient plates secured to plural sides of said tubular valve membrane.

14. The seedling transfer apparatus as described in claim 11, wherein said expandable chamber comprises a bellows and said expansion means comprises a pressure-operated cylinder having a housing connected to a first side of said bellows and a rod connected to a second side of said bellows such that when said rod extends outwardly from said housing, said bellows expands.

15. In a seedling transfer apparatus having an expandable chamber connected at a first end to a tube into which a seedling is inserted in sealing relation and having a pressure-responsive valve at a second end thereof, said pressure-responsive valve comprising:
   (a) a membrane being moveable between a position in which said second end is substantially open and a position in which said second end is closed;
   (b) means for biasing said membrane toward said closed position; and
   (c) said membrane being formed of three or more substantially planar triangular resilient plates which are connected by an equal number of flexible panels, wherein said membrane is adapted to close when pressure within said chamber and said tube is less than pressure therewithout.

16. The seedling transfer apparatus as described in claim 15, wherein said membrane comprises four substantially planar segments.

17. The seedling transfer apparatus as described in claim 15, wherein said plurality of substantially planar segments are secured to said flexible member.

18. The seedling transfer apparatus as described in claim 15, wherein portions of each said flexible panel is secured to portions of each adjacent said flexible panel in a manner causing said membrane to be biased toward said closed position.

19. A seedling transplanter machine for moving seedlings into soil from a plant starting tray having a plurality of seedling cells each with side walls and an open top and bottom and having a seedling with a soil ball contained therewithin, said machine comprising:
   (a) a metering transplanter, comprising:
      (i) a frame;
      (ii) means attached to said frame for transporting said frame over the ground;
      (iii) a drop tube attached to said frame and having an open top and a metering gate for depositing each of said seedlings sequentially in a spaced series; and
   (b) a seedling transfer apparatus, comprising:
      (i) a substantially horizontal table attached to said frame and having an elongate slot formed transversely therein and vertically therethrough;
      (ii) means to controllably index said starting tray in a direction substantially perpendicular to said slot;
      (iii) means mounted on said table above said slot and capable of moving between an up and a down position for pushing a selected seedling and soil ball downwardly out of a selected cell in said tray and positionable along a line substantially parallel to said slot;
      (iv) a tube mounted on said table below said slot co-axial and positionable with said pushing means and adapted for receiving said selected seedling from said pushing means so that said soil ball of said selected seedling substantially engages an inner periphery of said tube;
      (v) means for moving said seedling and said soil ball out of said tube; and
      (vi) means for moving said pushing means and said tube synchronously along a line substantially parallel to said slot to align with sequential ones of said plurality of cells.

20. The seedling transplanter machine as described in claim 19, wherein said means for moving said seedling and said soil ball out of said tube comprises means to create a pressure differential between a location above said soil ball and a location below said soil ball within said tube.

21. The seedling transplanter machine as described in claim 19, further comprising an expandable chamber connected at a first end in sealed relation to said tube and having a pressure-responsive valve at a second end thereof.

22. The seedling transplanter machine as described in claim 21, wherein said expandable chamber comprises a bellows and further comprising a pressure-operated cylinder having a housing connected to a first side of said bellows and a rod connected to a second side of said bellows such that when said rod extends outwardly from said housing, said bellows expands.

23. A method for transferring a series of seedlings individually from a plant starting tray having a plurality of seedling cells with side walls and an open top and bottom and each such cell having a seedling with a soil ball therewithin, to a soil location, comprising the steps of:
   (a) positioning said plant starting tray such that a selected one of said seedling cells having a seedling therein resides between a pusher unit and an axially aligned transfer tube;
   (b) extending said pusher unit so as to move said seedling from said selected seedling cell into said transfer tube;
   (c) retracting said pusher unit; and
   (d) creating a pressure differential from a first side to a second side of said seedling so as to move said seedling out of said tube into a soil location.

24. A seedling transfer apparatus for transferring seedlings from a plant starting tray having a plurality of seedling cells each with side walls and an open top and bottom and having a seedling with a soil ball contained therewithin, said apparatus comprising:
   (a) a substantially horizontal table having an elongate slot formed transversely therein and vertically therethrough;
   (b) means to controllably index said starting tray uniaxially along said slot in a direction substantially perpendicular to said slot;
   (c) means mounted on said table above said slot and capable of moving between an up and a down position for pushing a selected seedling and soil ball downwardly out of a selected cell in said tray and positionable along a line substantially parallel to said slot;
   (d) a tube mounted on said table below said slot co-axial and positionable with said pushing means said tube adapted for receiving said selected seedling from said pushing means so that said soil ball of said selected seedling substantially engages an inner periphery of said tube;
   (e) means for moving said seedling and said soil ball out of said tube;
   (f) means for moving said pushing means and said tube transversely synchronously to align with sequential ones of said plurality of cells; and
   (g) wherein said pushing means comprises a linear motion device having a pusher blade mounted to a rod thereof and sized to push said seedling and said soil ball through said selected cell, said pusher blade having a cam portion configured and positioned to contact a fixed member as said pusher blade is moved up such that a lower portion of said pusher blade pivots upwardly.

* * * * *

UNITED STATES PATENT AND TRADEMARK OFFICE
CERTIFICATE OF CORRECTION

PATENT NO. : 5,765,491
DATED : June 16, 1998
INVENTOR(S) : Lennis R. Brower and James R. Hammerle It is certified that error appears in the above-identified patent and that said Letters Patent is hereby corrected as shown below:

Column 3, line 65, after "1/8" insert --inch--.

Column 6, line 6, change "Figs. 6-9" to read --Figs. 6A-9B--.

In the Drawings, delete Sheets 4,5 and 8, and substitute therefor the corrected drawing sheets 4,5 and 8 consisting of Figs.5A-5C; 5D-5F; and Figs. 11, 12 and 14, as shown on the attached pages.

Signed and Sealed this

Fifteenth Day of September, 1998

*Attest:*

BRUCE LEHMAN

*Attesting Officer*     *Commissioner of Patents and Trademarks*